United States Patent

Burt et al.

(10) Patent No.: US 8,465,103 B2
(45) Date of Patent: Jun. 18, 2013

(54) SELF PROPELLED TRANSPORT DEVICE

(76) Inventors: John Burt, Collegeville, PA (US);
Jacqueline Crozier, Philadelphia, PA (US)

(*) Notice: Subject to any disclaimer, the term of this patent is extended or adjusted under 35 U.S.C. 154(b) by 55 days.

(21) Appl. No.: 12/986,857

(22) Filed: Jan. 7, 2011

(65) Prior Publication Data
US 2011/0163588 A1 Jul. 7, 2011

Related U.S. Application Data

(60) Provisional application No. 61/292,987, filed on Jan. 7, 2010.

(51) Int. Cl.
*B62D 55/06* (2006.01)
*B62D 51/04* (2006.01)
*B60P 1/28* (2006.01)

(52) U.S. Cl.
USPC .............. 298/17 R; 298/1 C; 298/2; 180/9.22

(58) Field of Classification Search
USPC .............. 298/2, 17 R, 3, 1 C, 17.6–17.8, 1 A, 298/1 B, 10; 56/204, 203, 202
See application file for complete search history.

(56) References Cited

U.S. PATENT DOCUMENTS

| | | | |
|---|---|---|---|
| 5,195,308 A * | 3/1993 | Grote et al. | 56/16.4 R |
| 6,182,383 B1 * | 2/2001 | Reed, Jr. | 37/242 |
| 6,409,273 B1 * | 6/2002 | Campbell | 298/2 |
| 6,499,236 B2 * | 12/2002 | Yoshida et al. | 37/219 |
| 6,715,980 B2 * | 4/2004 | Bouthillier | 414/642 |
| 7,017,998 B2 * | 3/2006 | Ducharme | 298/2 |
| 7,108,089 B2 * | 9/2006 | Hanafusa et al. | 180/65.245 |
| D604,333 S * | 11/2009 | Yuzuriha et al. | D15/12 |
| 2006/0006726 A1 * | 1/2006 | Garvey | 298/2 |

* cited by examiner

*Primary Examiner* — Glenn Dayoan
*Assistant Examiner* — Sunsurraye Westbrook
(74) *Attorney, Agent, or Firm* — Lempia Summerfield Katz LLC

(57) ABSTRACT

A transport device has a chassis with a front end and a rear end. The device has a continuous track supporting the chassis above a surface configured to move the chassis along the surface. A handle extends from the front end or rear end of the chassis and has a grip section positioned to be gripped by a user walking ahead of or behind the chassis. A motor is coupled and arranged to drive the continuous track and is operable by a user manipulating the handle. The worktop can be reconfigurable to at least two optional arrangements having different storage or support capabilities. The worktop can also be interchangeable with other different worktops having different storage or support capabilities.

23 Claims, 14 Drawing Sheets

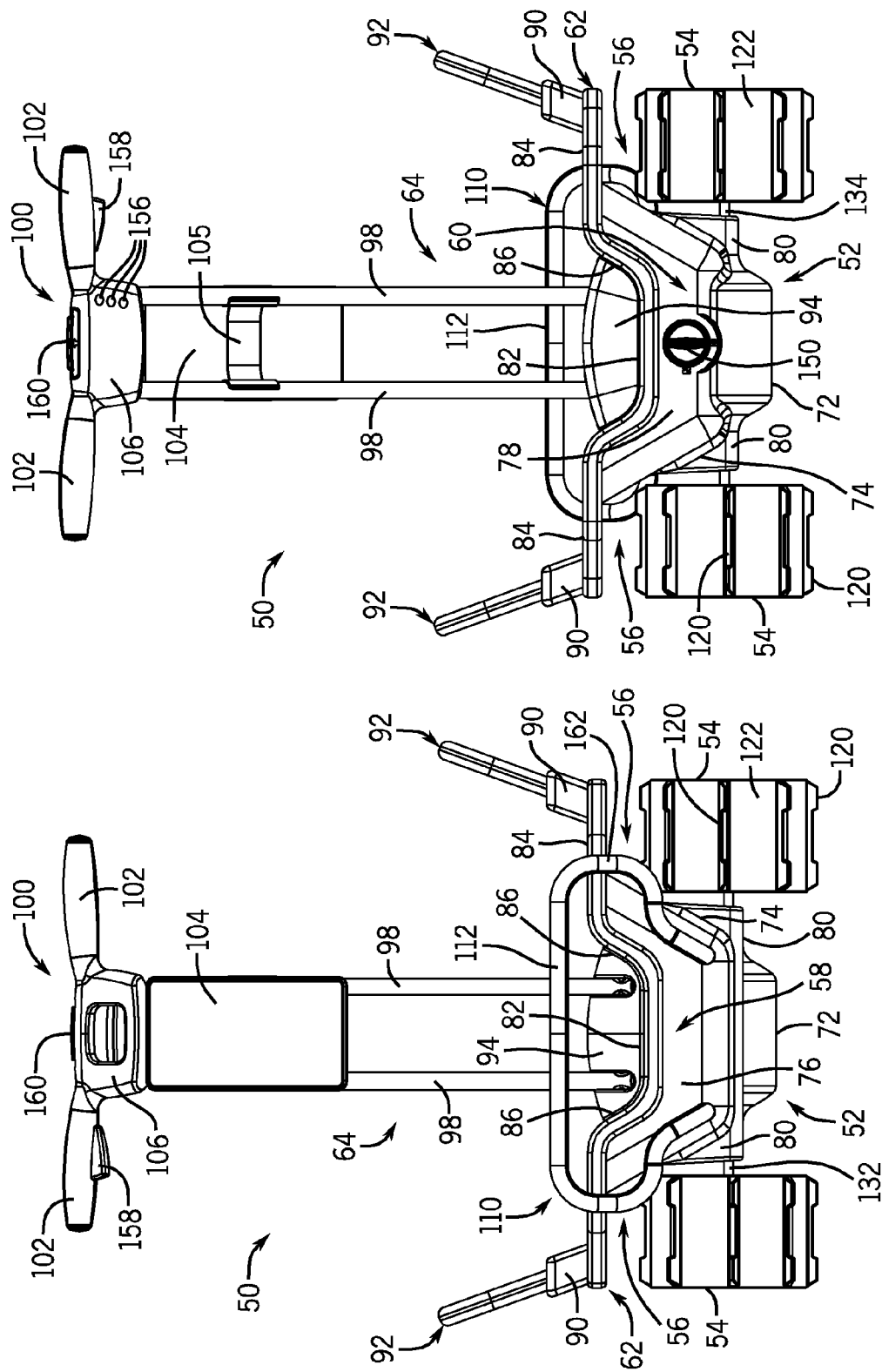

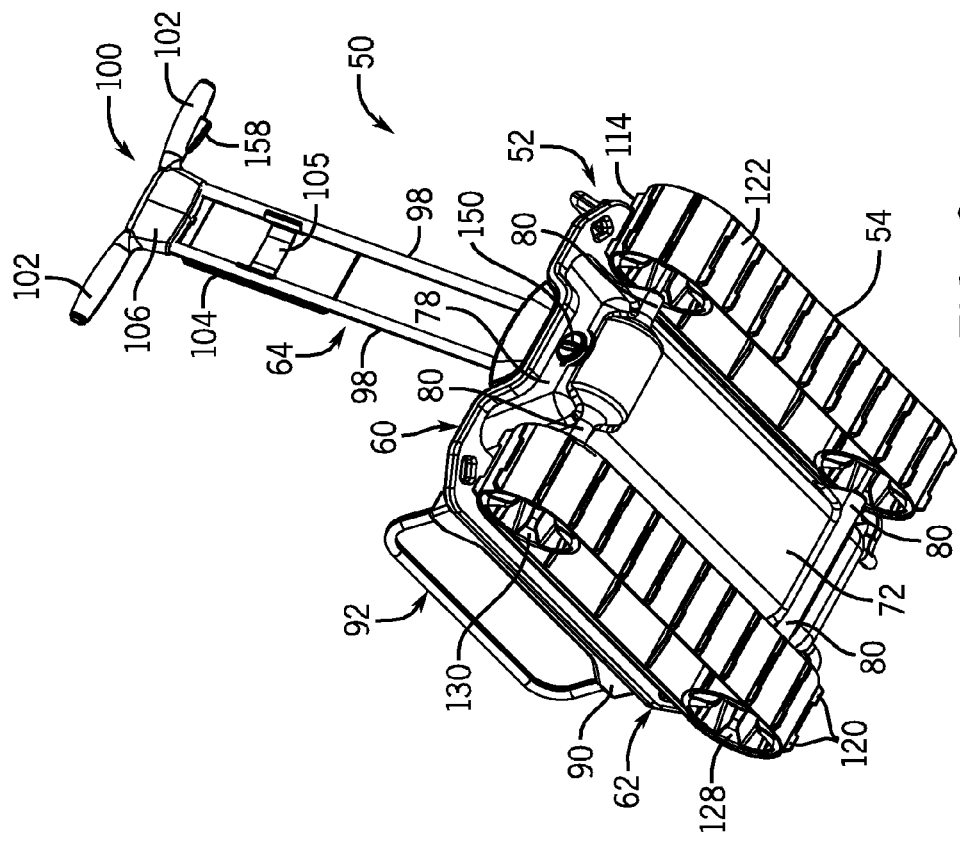
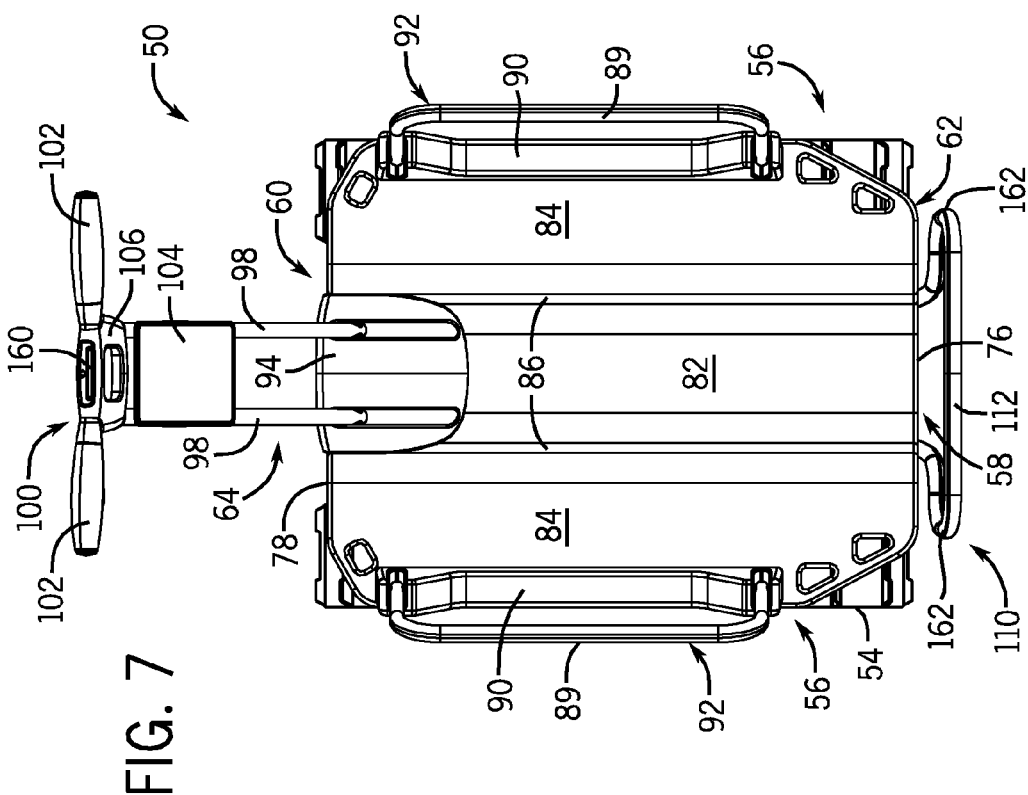

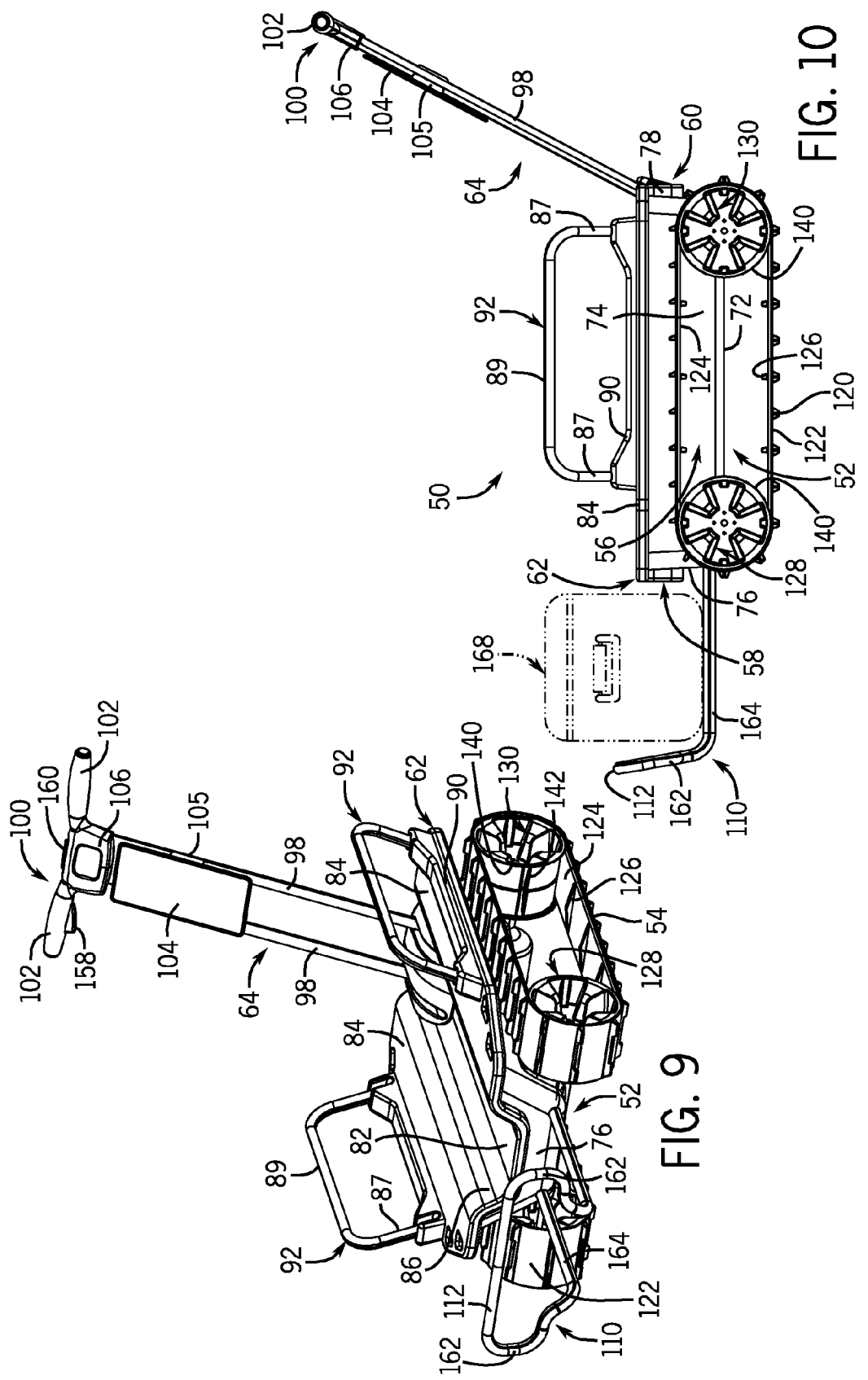

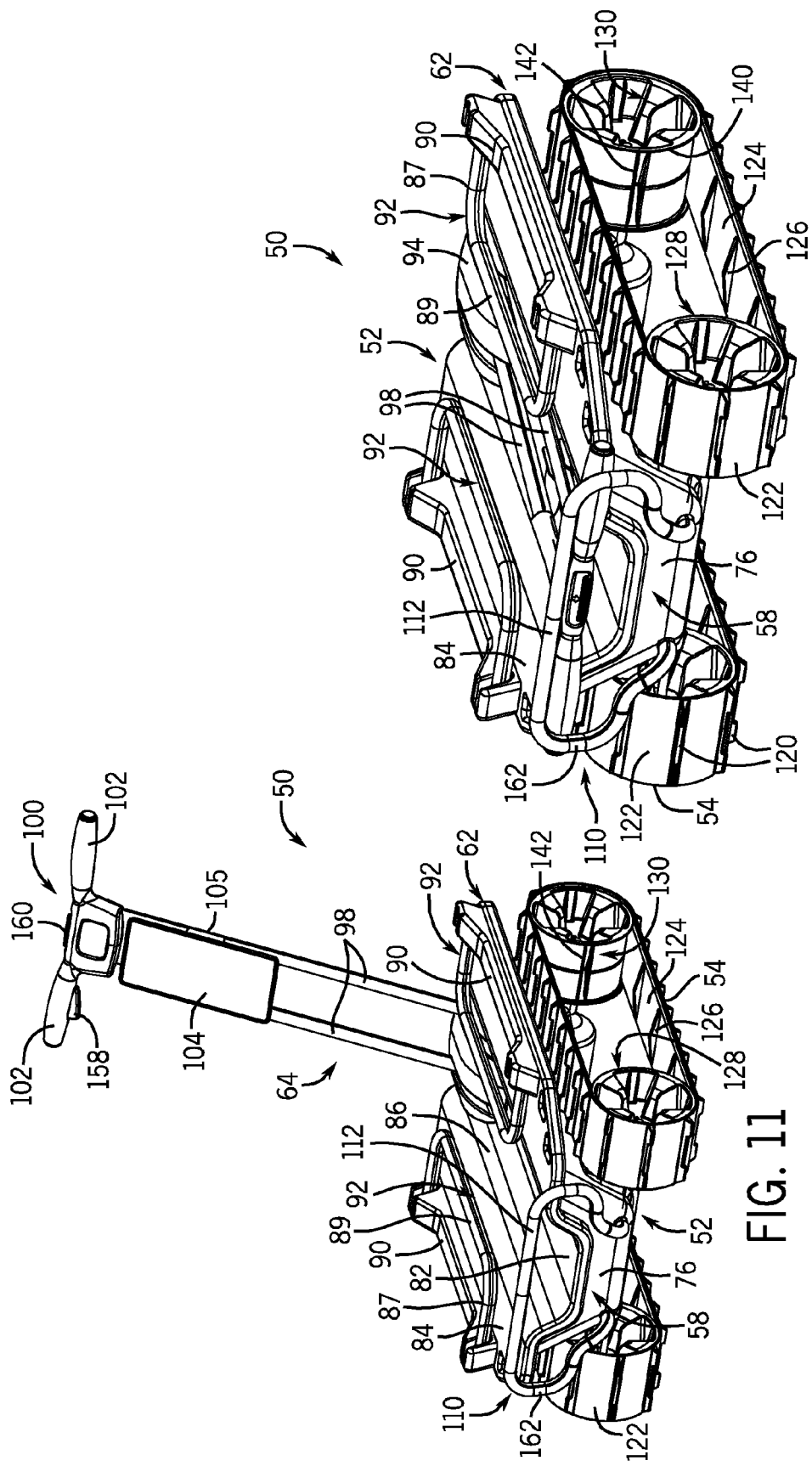

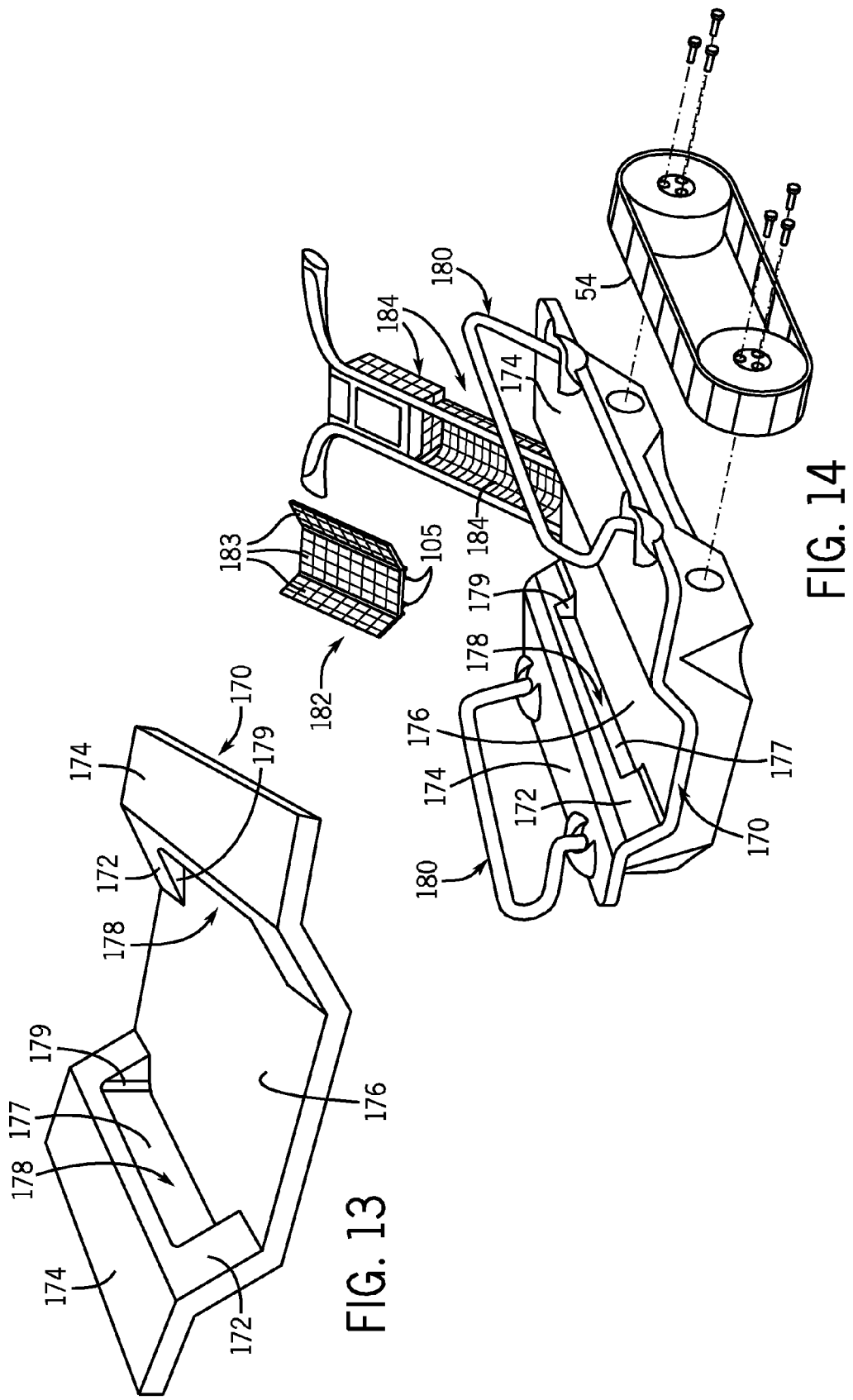

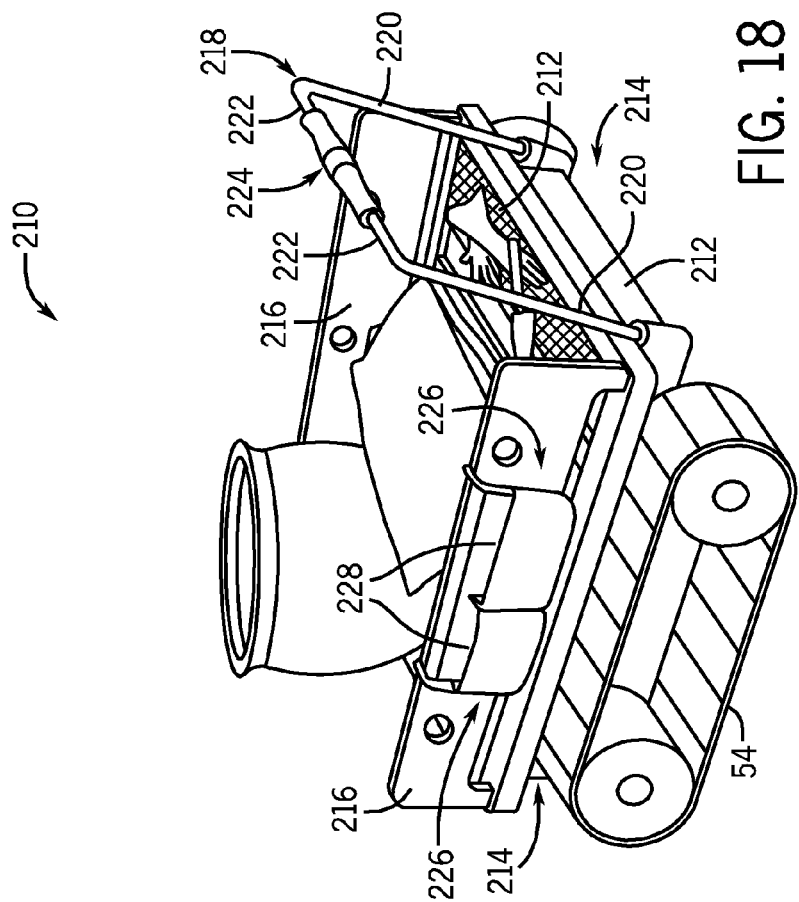
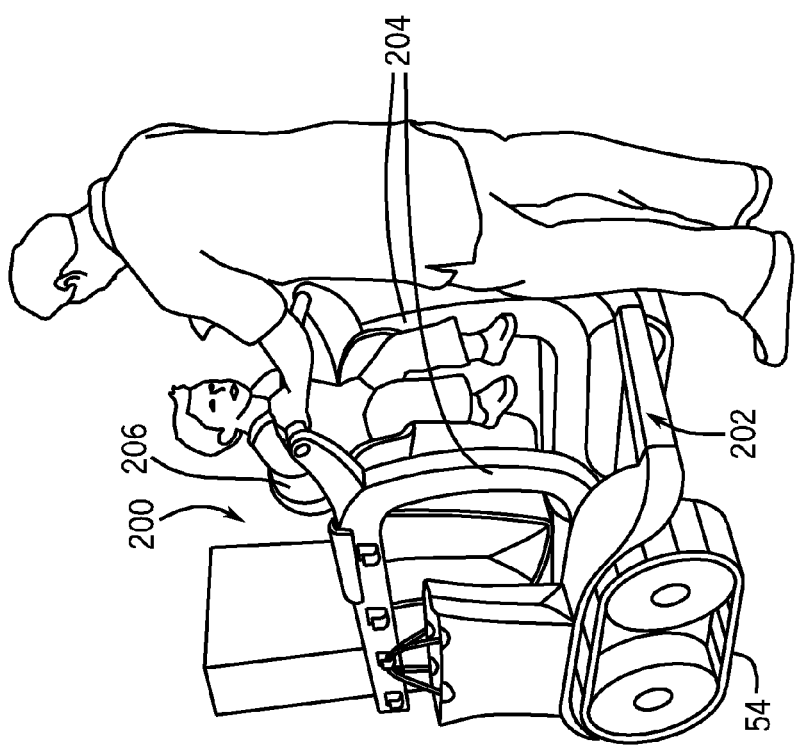

SELF PROPELLED TRANSPORT DEVICE

RELATED APPLICATION DATA

This patent is related to and claims priority benefit of U.S. provisional patent application Ser. No. 61/292,987, which was entitled "Self Propelled Beach Transport" and filed on Jan. 7, 2010. The entire contents of this prior filed application are hereby incorporated herein by reference.

BACKGROUND

1. Field of the Disclosure

The present invention is generally directed to carts or wagons for transporting articles, and more particularly to a self-propelled or motorized transport device with tracks.

2. Description of Related Art

Many different types of carts, dollies, wagons, and the like are known in the art for transporting goods, objects, and articles of manufacture. Many of these types of products are intended for use only on hard, flat, relatively smooth surfaces. Several producers of such devices have attempted to provide a device that can be maneuvered over sand or other difficult terrain to transport articles and objects. However, these devices are typically difficult to maneuver. In addition, such devices are typically not self-propelled, but instead are intended to be manually propelled, i.e., pushed or pulled by a user over the sand or other terrain. This can make it especially difficult for a user to maneuver the transport device over difficult or rough terrain, including dirt, rocks, uneven terrain, snow, and mud, as well as sand.

Larger vehicles, such as those designed and used for military purposes are known to employ continuous tracks for transporting people and heavy-duty cargo. Tracks are typically used when the vehicle is intended to or expected to run over difficult terrain. Half-tracks and tanks are just to such examples. Smaller vehicles, such as snowmobiles, are also known in the art that utilize a track to propel the vehicle over difficult terrain. However, these types of vehicles are typically not suited for transporting articles or objects, but instead are designed to transport a person or multiple people over such a surface while sitting on the vehicle.

Many types of carts or wagons are also known and utilized to transport bulk and/or heavy-duty items. Many of these types of transport devices use wheels and are manually propelled and are typically designed for use on smooth surfaces. Some are self propelled but are also intended for use over flat, hard ground. Examples of these types of vehicles and devices include dollies, lifts, wheelbarrows, shopping carts, and the like. These types of devices are not typically easy for an individual to maneuver over rough or difficult terrain and are particularly unsuited for transporting objects or articles over sand. These types of carts, dollies, wagons, and the like are also typically designed for a specific purpose and are not well-designed or well suited for alternate purposes.

SUMMARY

In one example according to the teachings of the present invention, a transport device has a chassis with a front end and a rear end. A continuous track supports the chassis above a surface and can selectively move the chassis along the surface. A handle extends from the front end or the rear end of the chassis and has a grip section positioned to be gripped by a user walking ahead of or behind the chassis, respectively. A motor is coupled and arranged to drive the continuous track and is operable by a user manipulating the handle.

In one example, the handle extends rearward from the rear end and can be pushed forward to operate the motor to move the transport device forward and can be pulled rearward to operate the motor to move the transport device rearward.

In one example, the chassis can be configured to removably accept a plurality of optionally different worktops thereon.

In one example, the worktop can be a wheelbarrow tub.

In one example, the worktop can have a work surface thereon. The work surface can be pivotally connected to and tiltable forward about the front end of the chassis.

In one example, the worktop can have a multilevel storage surface thereon.

In one example, the worktop can define a storage surface thereon. A pair of side rails can extend along opposed sides of the storage surface.

In one example, the worktop can have a pair of side rails along sides of thereof. The side rails can be removable from the transport device.

In one example, the worktop can have a pair of side rails along sides of thereof. The side rails can be pivoted inward and downward onto the worktop or outward and downward along opposed sides of the chassis or both.

In one example, the transport device can have two of the tracks, one arranged adjacent each side of the chassis.

In one example, the transport device can have two pairs of wheels. Each pair of wheels can have a front and a back wheel for driving a respective one of the two tracks. Each wheel can have an outer rim section fastened to and removable from an inner rim section.

In one example, the transport device can have two pairs of wheels. Each pair of wheels can have a front and a back wheel for driving a respective one of the two tracks. Each wheel can have an outer rim section fastened to and removable from an inner rim section. The inner and outer rim sections can each have an annular rim flange. A track can be captured between the rim flanges of the inner and outer rim sections of the front and back wheel of each pair of wheels.

In one example, the grip section of the handle can include a trigger actuable to select and change the speed of the motor.

In one example, the grip section of the handle can have an actuator that can be actuated to select and change the motor direction between a forward direction and a reverse direction.

In one example, the handle can be collapsed down onto the worktop.

In one example, the chassis can be a modular structure configured to removably support any selected one of a plurality of optional worktops thereon.

In one example, the transport device can be a modular structure configured to removably support any selected one of a plurality of optional worktops thereon. The plurality of optional worktops can include a tub-shaped container, a multilevel storage surface, a generally planar platform, a reconfigurable storage surface, a multi-compartment storage box, a seat, a large covered storage container, a tiltable platform, a removable platform, and/or a cooler or insulated container.

In one example, the front end of the chassis can have a generally vertical barrier. The barrier can be adjustably moved toward and away from the front end to extend a storage capacity of at least part of the worktop.

In one example, the worktop can have an insulated chamber built into a portion of the chassis.

In one example, the motor is an electric motor coupled to a battery that can be recharged by a solar panel removably carried on part of the transport device.

In one example according to the teachings of the present invention, a transport device has a chassis with a front end, a rear end, and a worktop surface. Continuous tracks support the chassis above a surface, are routed around a plurality of wheels, and are configured to propel the chassis along the surface. A handle extends rearward from the rear end of the chassis and has a grip portion positioned for an operator to walk behind the chassis. An electric motor is carried by the chassis and is arranged to drive the wheels and continuous tracks. The worktop surface is reconfigurable to at least two optional arrangements having different storage or support capabilities.

BRIEF DESCRIPTION OF THE DRAWINGS

Objects, features, and advantages of the present invention will become apparent upon reading the following description in conjunction with the drawing figures, in which:

FIG. 4 shows a front view of the transport device in FIG. 1.

FIG. 5 shows a rear view of the transport device in FIG. 1.

FIG. 7 shows a top view of the transport device in FIG. 1.

FIG. 8 shows a bottom perspective view of the transport device in FIG. 1.

FIG. 9 shows the transport device in FIG. 1 with a front part extended forward for added storage capacity.

FIG. 10 shows a side view of the transport device in FIG. 9.

FIG. 11 shows the transport device in FIG. 1 in a partly folded configuration.

FIG. 12 shows the transport device in FIG. 11 in a completely folded configuration.

FIG. 13 shows a perspective view of one example of an alternate worktop configuration for the transport device in FIG. 1.

FIG. 14 shows the worktop in FIG. 13 on a transport device in accordance with the teachings of the present invention.

FIG. 17 shows a perspective view of another example of a transport device in accordance with the teachings of the present invention.

FIG. 18 shows a perspective view of another example of a transport device in accordance with the teachings of the present invention.

DETAILED DESCRIPTION OF THE DISCLOSURE

Figure 1:
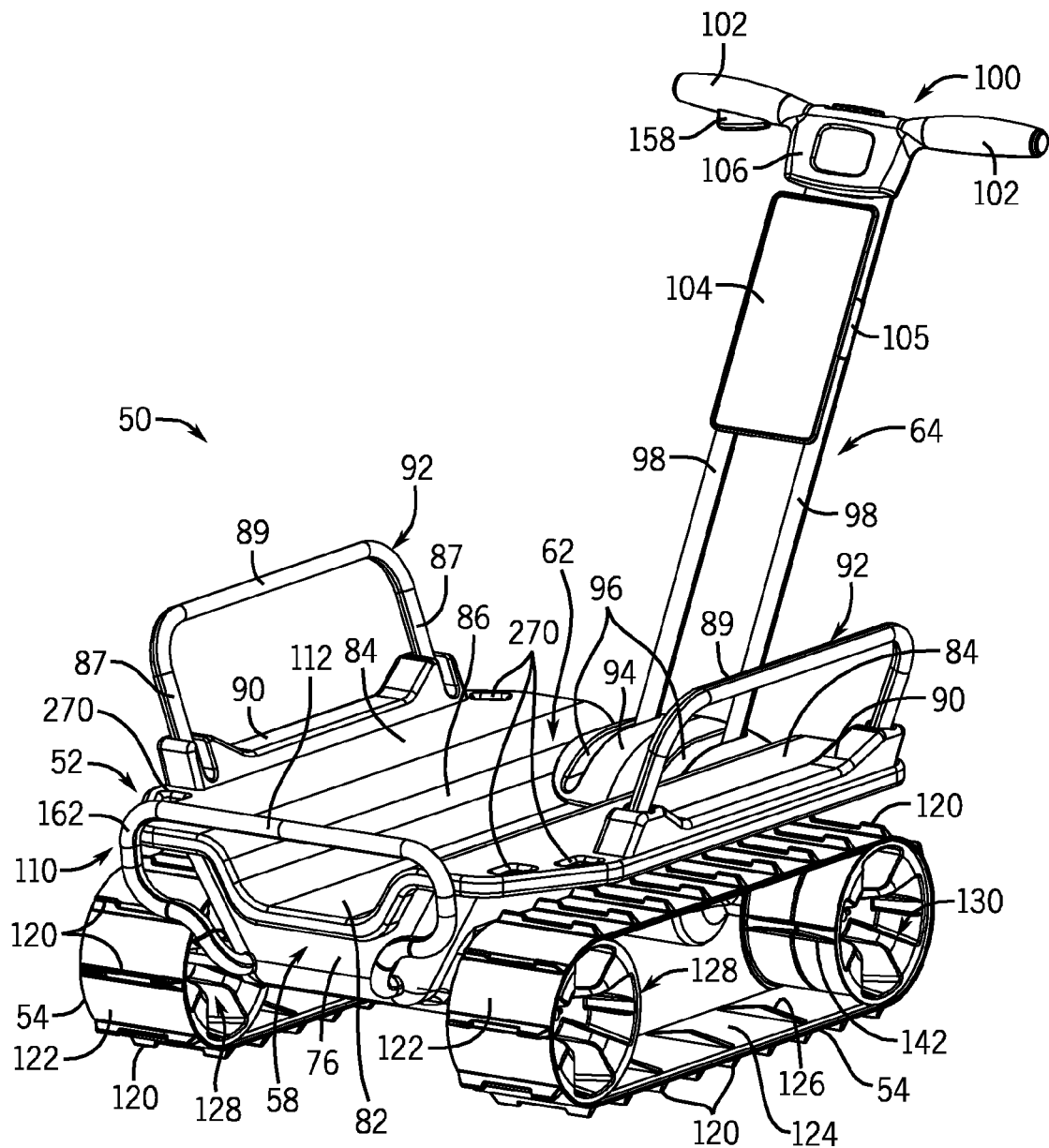
FIG. 1 shows a perspective view of one example of a transport device in accordance with the teachings of the present invention.

The present invention is directed to a self-propelled transport device that is particularly well suited to transport objects, articles, materials, and the like over difficult terrain such as sand, rocks, dirt, mud, snow, and other uneven, soft surfaces. In one example, the disclosed transport device has a chassis with a worktop that can be reconfigured between two or more different arrangements or swapped out for another different type of worktop. In one example, the disclosed transport device utilizes tracks driven by wheels whereby the device can easily move over difficult terrain. In one example, the disclosed transport device has a handle whereby an operator can stand behind the device and easily maneuver the device via the handle. In one example, the disclosed transport device has a motor that drives the wheels and tracks requiring little effort on the part of the operator to propel the transport device over any terrain. The disclosed self propelled transport devices solve or improve upon one or more of the above-noted and/or other problems and disadvantages with prior known carts, wagons, dollies, and other such article movers and devices. The foregoing and other objects, features, and advantages of the present invention will become apparent to those having ordinary skill in the art upon reading this disclosure.

Turning now to the drawings, FIGS. 1-7 illustrate various views of a self-propelled transport device 50 constructed in accordance with the teachings of the present invention. In the disclosed example, the transport device 50 generally has a chassis 52 with a pair of continuous tracks 54 supporting the chassis above a surface. The continuous tracks 54 are positioned along opposed sides 56 of the chassis 52. Though two tracks are shown, it is conceivable that the transport device could be provided with a single track or more than two tracks, if desired. The chassis generally has a front end 58, a rear end 60, and a worktop 62. A handle assembly 64 extends upward and rearward from the rear end 58 and is used to operate and maneuver the transport device 50. Details of the various features of the transport device 50 can vary within the spirit and scope of the present invention, as will become evident to those having ordinary skill in the art upon reading this disclosure and as is described below. For example, the worktop 62 is shown as a separate structure herein. However, the worktop could be provided as an integral part of the chassis or other frame structure of the transport device, if desired.

Figure 2:
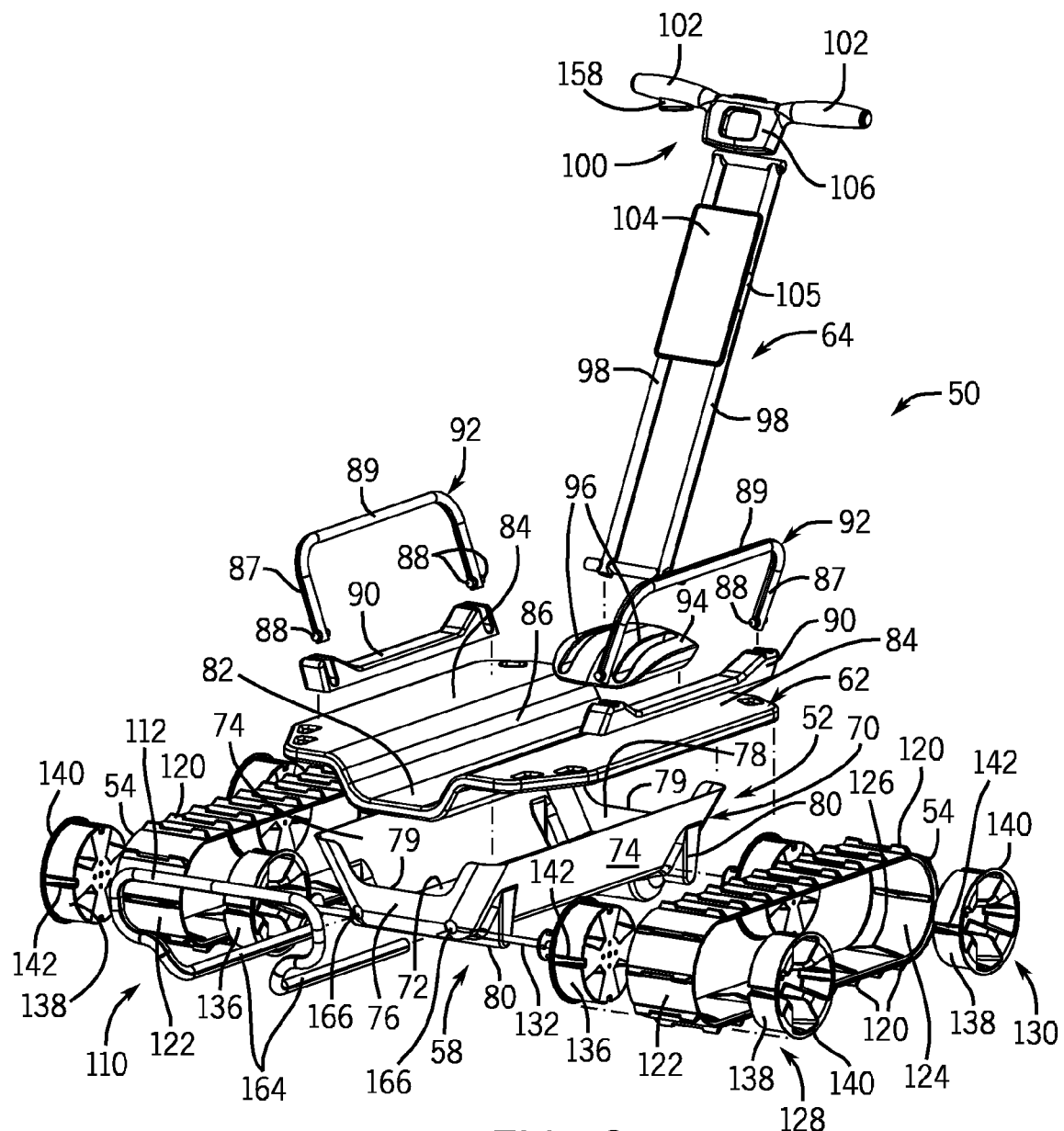
FIG. 2 shows an exploded view of the transport device in FIG. 1.

FIG. 2 shows an exploded view of the transport device 50 depicted in FIG. 1. In the disclosed example, the chassis 52 has a tub-shaped body 70 with a closed bottom 72, elongate and somewhat upright side panels 74, a front panel 76, and a rear panel 78. The top of the body 70 is open in this example. The front and rear panels 76 and 78 have a central scalloped region 79 in this example at about a midpoint between the side panels 74. A pair of axle struts 80 protrudes outward from each of the side panels 74, one strut near the front end 58 and one strut near the rear end 60 on each side 56 of the body 70.

In the disclosed example, the worktop 62 is a multi-level platform with a lower elevation, central trough or surface 82 and a pair of elevated surfaces 84 that flank the trough. A pair of transition walls 86 extends between the trough surface 82 and the elevated surfaces 84. In this example, the transition walls 86 are angled or drafted outward, as are the side panels 74 of the body 70, moving up from the trough 82 to the elevated surfaces 84. The scalloped regions 79 in the front and rear panels 76, 78 are configured to accommodate the shape of the worktop 62. The worktop 62 is mounted to the body 70, closing off the open top of the body. The worktop 62 can be secured using any suitable means such as fasteners, clamps, snaps, detents, welds, clasps, latches, or the like.

As is discussed in greater detail below, and as will become evident to those having ordinary skill in the art upon reading this disclosure, the worktop 62 can vary considerably within the spirit and scope of the present invention. In one simple example, the orientation of the worktop 62 can be rotated 90° so that the central trough surface 82 extends laterally or side to side relative to the transport device 50 instead of lengthwise as shown herein. In such an example, the orientation of the elevated surfaces 84 would also be side to side defining a front elevated surface and a back elevated surface instead of a pair of side elevated surfaces 84 as shown.

In the disclosed example, the chassis 52 includes a pair of side rail mounts or brackets 90. One of the brackets 90 is mounted to the worktop 62 on each corresponding one of the elevated surfaces 84. An inverted U-shaped side rail 92 is coupled to each of the brackets 90 in this example. The side rails in this example have a pair of depending legs 87 and a cross-bar 89 extending between the legs. The free bottom ends of the legs can have pivot 88, such as protruding pins, stubs, or the like. The pivots 88 can attach to the mounts 90 so that the rails can be pivotally movable relative to the mounts. The mounts or brackets 90 can be integrally formed as part of the worktop 62 or can be separately manufactured and removably or permanently attached to the worktop, as desired. The side rails can be steel, aluminum, plastic, wood, composite, a combination of said materials, or the like and can be planar, solid, hollow, tubular, or the like. The configuration and construction of the mounts 90, as well as the side rails 92 can vary within the spirit and scope of the present invention.

Referring again to FIGS. 1-7, the handle assembly 64 is coupled to a pivot housing 94. The pivot housing 94 is mounted to the trough surface 82 at the rear end 60 on the chassis 52. The pivot housing 94 has a pair of guide slots 96 in its top, curved surface. The handle assembly 64 also has a pair of elongate frame arms 98 and a grip section 100 coupled to the distal ends of the frame arms. The proximal ends of the frame arms 98 are seated in the guide slots 96 and pivotally connected to the pivot housing 64 for reasons discussed below.

In the disclosed example, the grip section 100 of the handle assembly 64 has a pair of grips 102 projecting in opposite directions, giving the handle assembly a somewhat T-shaped configuration. The shape and configuration of the handle assembly can vary from this example. The frame arms 98 are spaced apart laterally from one another. A solar panel 104 is mounted to and between the frame arms 98 near the grip section 100. The solar panel 104 can have one or more clips 105 or other connectors to removably attach the panel to the frame arms 98 of the handle assembly 64. The solar panel 104 is an optional feature and is discussed in greater detail below. A motor control housing 106 is also mounted to the distal ends of the frame arms 98 on the handle assembly 64. The motor control housing 106 houses components that are utilized to assist in operating transport device as described below. The motor control housing 106 can also include one or more storage compartments for storing smaller personal items, such as keys, wallets, cell phones, MP3 devices, cameras, and the like.

The chassis 52 in the disclosed example has a front barrier 110 or bumper. In this example, the front barrier 110 has a transverse rail 112 similar to the side rails 92. The rail 112 extends across the front end of the chassis 52 and is positioned above the level of the trough surface 82 and can act as a barrier wall to close the open front of the chassis. Again, the front barrier 110 can vary in configuration and construction from the example shown and described him. The barrier can be an integral part of the chassis 52 or the worktop 62, or can be another structure attached or connected to either one of those components.

Figure 3:
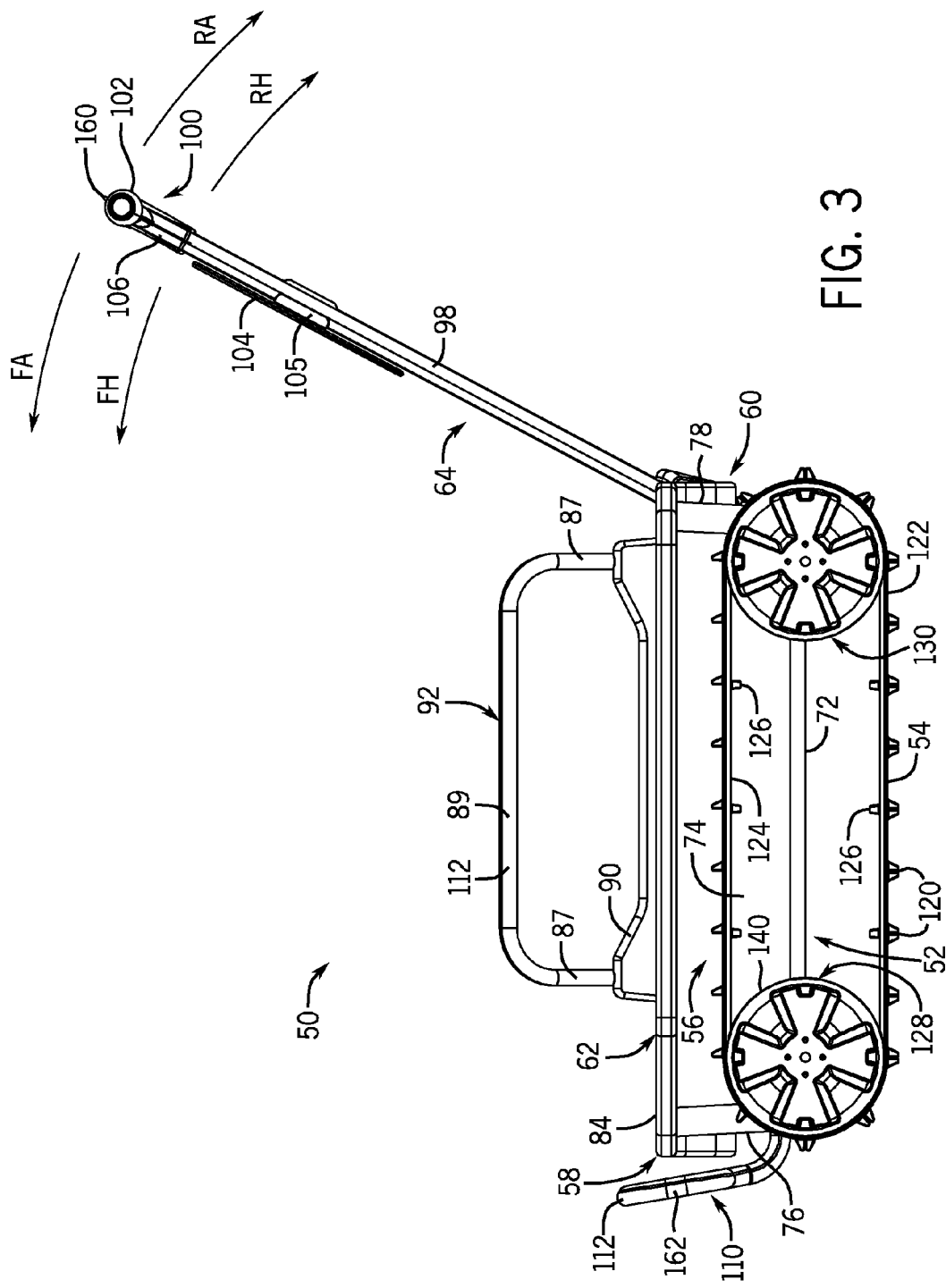
FIG. 3 shows a side view of the transport device in FIG. 1.

With reference to FIGS. 1-3, the tracks 54 are continuous loops of material, such as rubber or reinforced rubber. A plurality of treads 120 extend laterally across the width of each track. The treads 120 are provided on the outer facing surface 122 of each track and are configured to contact the surface on which the transport device rests. The inside surfaces 124 of the tracks also include a plurality of transverse ribs 126. Each side of the chassis 52 has a pair of wheels including a front wheel 128 and a rear wheel 130. The front wheels 128 of the transport device 50 are connected to one another by a front axle 132. Likewise, the rear wheels 130 are connected to one another by a rear axle 134. The axles extend across the chassis body and extend through the respective front and rear axle struts 76, 78.

Returning to FIG. 2, each of the wheels 126 and 128 has the same construction in this example. Each of the wheels 126 and 128 has a split rim. Each rim has an inner rim section 136 and an outer rim section 138. In the disclosed example, the rim sections 136 and 138 are also entirely identical to and interchangeable with one another. Each of the rim sections as an annular rim flange 140 extending around and radially outward from the outer side of the rim. The tracks 54 are captured between the rim flanges 140 on each wheel 128, 130. The rim sections 136 and 138 can be separated from one another or fastened to one another using conventional fasteners. When the rims are disassembled, the tracks can be easily removed upon removing the outer rim sections 138 on each of the wheels. The exposed circumferential surfaces of the assembled rims include a plurality of transverse grooves 142 spaced circumferentially around the rim. The ribs 126 on the inside surfaces 124 of the tracks 54 seat in the grooves 142, coupling the wheels and tracks. The tracks 54 are thus prevented from slipping relative to the wheels 128, 130 during use of the transport device 50.

Figure 6:
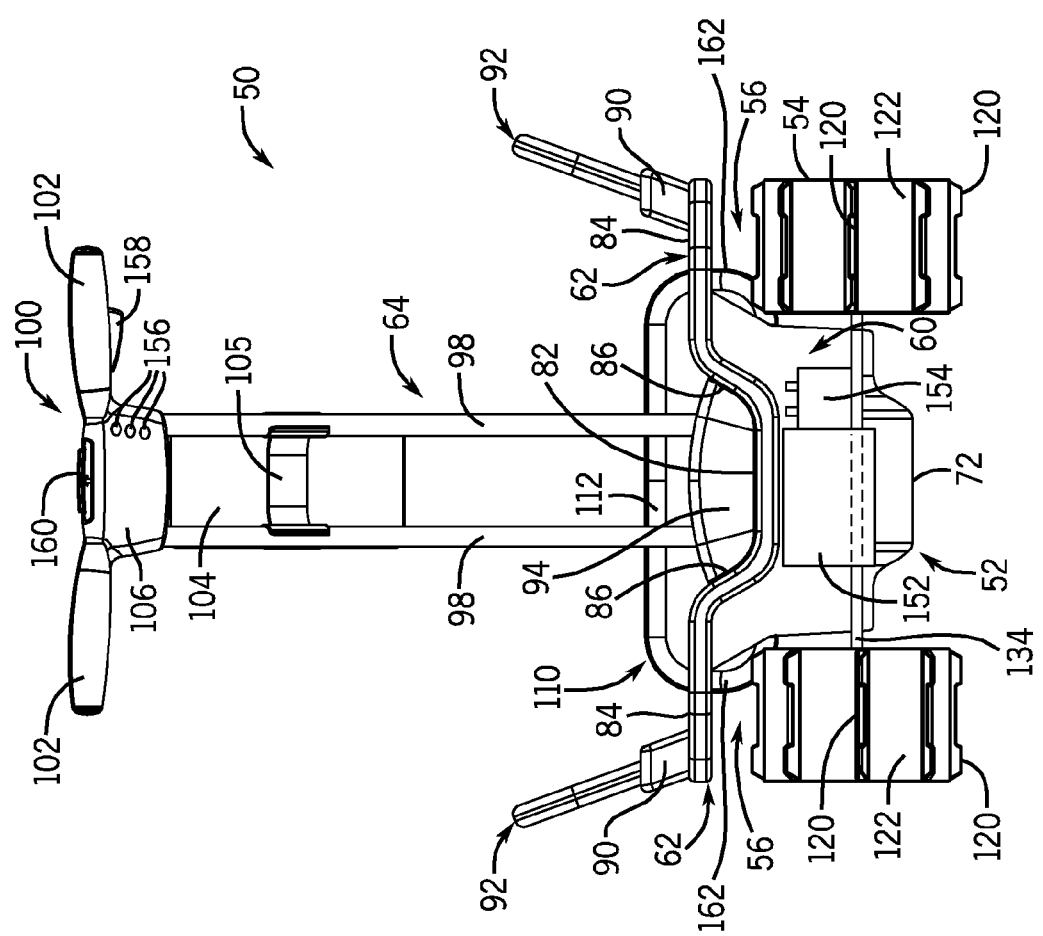
FIG. 6 shows the transport device in FIG. 5 with part of the chassis cut away.

With reference to FIGS. 5 and 6, the rear panel 78 on the chassis body 70 has a motor control switch 150. In this example, the switch 150 is rotatable and used to operate a motor 152 shown schematically in FIG. 6. The switch can operate a gearbox or transmission (not shown) of the motor 152 between a drive D position and a neutral N position. In the drive D position, the motor 152 will drive the rear axle 134, which in turn rotates the rear wheels 130 to drive the tracks 54. In the neutral N position, the switch disengages the motor 152 or gearbox from the rear axle 134. The device 50 can be configured so as to be easily movable by a user with the motor off and the switch in the N position. The motor can be coupled to both the front axle 132 and rear axle 134, or to only the front axle 132 in alternate embodiments.

As shown, the motor 152 is housed in this example within the chassis 52 between the worktop 62 and the closed bottom 72. A motor chamber or well can be provided within the chassis to protect the motor 152, if desired. The motor 152 can take on any number of configurations and constructions and yet fall within the spirit and scope of the present invention. In one example, the motor 152 is an electric motor that operates on a rechargeable battery system. A battery 154 can be provided as the source of power. However, the motor can alternatively be of a type to run on other energy sources such as natural gas, propane, diesel fuel, refined fuel, kerosene, cooking oil, or the like. In the disclosed example, the electric motor 152 is run on a battery system and the battery 154 can be rechargeable using any suitable source. In one example, the battery 154 can be rechargeable using multiple different optional power sources such as the solar panel 104 noted above, a 12V car battery and adaptor cord, or an alternating current charger and cord. In one example, the motor controller 106 can include a plurality of optional jacks 156 that can connect to one or more of these energy sources. The jacks can be provided on the motor control housing 106, if desired, or on some other part of the device 50 closer to the motor or more convenient for the user. Additional jacks (not shown) can be provided to connect, operate, and recharge personal electronic devices, such as cell phones, CD players, DVD players, radios, MP3 players, and the like. Wiring can be routed through the frame arms 98 of the handle assembly 64 between the motor control housing 106 and motor 152 and battery 154 to connect and operate the various electronic components, features, options, and accessories of the transport device 50.

In one example, the motor 154 can be an electric 2-speed motor or a variable speed motor and can have a forward direction and reverse direction. The motor 154 can be configured to have a maximum speed that matches a fast walking pace of an average person, such as about 5 mph. As shown in FIGS. 1-6, a trigger 158 can be provided on part of the handle assembly 64, such as on one of the grips 102 of the grip section 100. The trigger 158 can be squeezed inward by an operator while manipulating the handle assembly 64 in order to turn the motor on and to variably change speeds or to switch between two or more speed options. Optionally, a separate on/off switch could be used in conjunction with an accelerator trigger. As shown in FIGS. 5 and 6, the grip section 100 of the handle assembly 64 can also include an actuator 160, such as directly between the grips 102 on the top of the motor control housing 106. The actuator 160 can be actuated by a user to select a forward or reverse travel direction or to switch between the two directions. In one example, the actuator 160 can be a flip switch that pushes forward to move the transport device 50 forward and that flips rearward to move the transport device rearward. See the arrows FA and RA in FIG. 3. In an alternate example, the entire handle assembly 64, inclusive of part of the pivot housing 94 can be coupled to the motor 154 and configured so that pushing the handle assembly forward drives the motor in a forward direction and pulling the handle assembly reverses the motor direction. See the arrows FH and RH in FIG. 3.

In one example, the two tracks of the transport device 50 will always move at the same speed. The device 50 can be steered simply by the user maneuvering the device using the handle in a desired direction. The device can be turned by overcoming friction between the surface and the tracks. Thus, turning the device will impart some minor track "scrubbing" where the inside track will have to release or the outside track will have to catch up, since the tracks move at the same speed. In another example, one or both of the tracks can have a variable speed capability to slow or speed up one track relative to the other for turning. Such capability would require two motors, speed sensors, speed controls, turning sensors, and/or the like. In another example, one or both of the tracks, axles, or wheel rims can employ some type of clutch to allow slight one of the tracks to slip relative to the other during a turn.

FIGS. 2, 9, and 10 show that the front barrier 110 can be optionally adjustable relative to the front end 58 of the chassis 52. In this example, the barrier 110 has a pair of depending legs 162 and extended down from the rail 112. The barrier 110 also has a pair of elongate, rearward extending parallel slide bars 164. The slide bars 164 are received in apertures 166 formed in the front panel 76 on the body 70. As shown in FIG. 9, the slide bars 164 of the barrier 110 can be slid or retracted into the body 70 so that the rail 112 is adjacent the worktop 62. As shown in FIG. 10, the barrier 110 can be slid outward or extended away from the front end 58. In the extended position, the slide bars 164 can create an extended support, platform, or storage surface. The adjustable barrier 110 thus creates an expandable, reconfigurable worktop arrangement. When the barrier 110 is extended, objects and items can be stored between the rail 112 and the front panel 76 on the body 70, resting on the slide bars 164. For example, a beach cooler 168 can be stored on the extended barrier 110 as shown in FIG. 10.

FIGS. 1, 11, and 12 show that the transport device 50 can be at least a partially collapsible or foldable structure. When in use, the various components of the device can be deployed as needed. When the transport device 50 is not to be used and is to be transported to another location or stowed away, the device may be folded or collapsed to a smaller or more compact configuration. In this example, the side rails 92 have depending legs 169 pivotally coupled to the mounts or brackets 90. The side rails 92 can be folded or collapsed inward from their deployed orientation of FIG. 1 toward or onto the worktop 62 as depicted in FIG. 11. Also in this example, the handle assembly 64 can fold from the in-use arrangement depicted in FIG. 1 to a folded or collapsed configuration depicted in FIG. 12. The frame arms 98 can pivot about their proximal ends on the pivot housing 94 and along the slots 96 therein. Alternatively, the handle assembly 64 could include a joint somewhere along the frame arms 98 so that the handle assembly can fold in half and then collapse onto the worktop 62. Also, the side rails 92 can be removable from the chassis 52 or worktop 62 and stowed or stored in the central trough 82. Alternatively, the side rails 92 can fold or collapse outward and downward adjacent in the side panels 74 of the body 70, if desired.

As noted above, the transport device 50 can vary considerably within the spirit and scope of the present invention. In one example, the worktop 62 can employ different contours, compartments, storage features, and the like. FIGS. 13 and 14 illustrate one alternate example of a worktop 170. In this example, the worktop 170 has transition walls 172 extending between elevated support surfaces 174 and a lower elevation trough surface 176 similar to the prior example. However, in this example, inner regions 178 of the transition walls 172 have a wall surface 177 of a much steeper angle or smaller draft angle than the surrounding portions of the transition walls 172. The width-wise transition between the inner regions of one draft angle and the outer transition walls 172 of a different draft angle will create corners 179. The wall surfaces 177 at the inner regions 178 and the corners 179 create a box-like receptacle within the worktop 170 configured to receive a box shaped object, such as a cooler or the like. The object will be captured and retained in position on the worktop within these inner regions 178 while being transported on the transport device 50.

Figure 15:
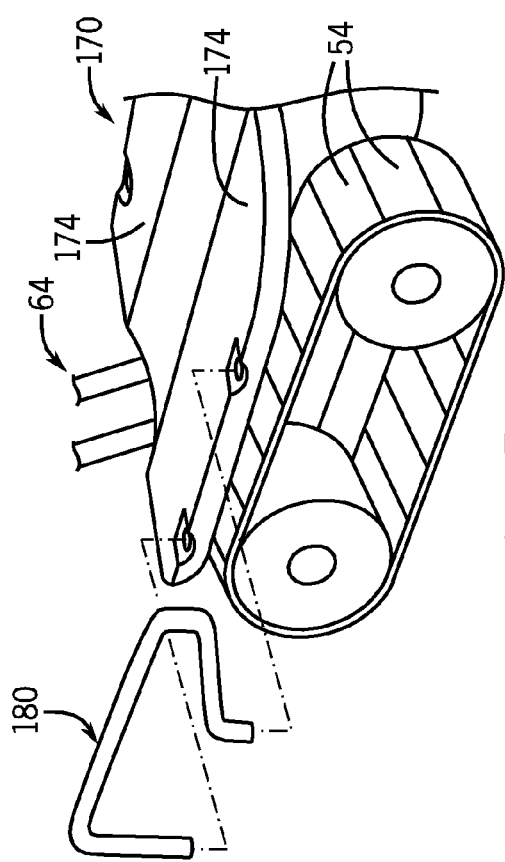
FIG. 15 shows a portion of the transport device in FIG. 14 with a side rail removed.

FIGS. 13 and 14 also illustrate an alternate example of a side rail 180 connected directly to the worktop 170 instead of to separate mounting brackets as in the prior example. With reference to FIG. 15, the side rails 180 can be removable from the worktop 170, as noted above. Removing the side rails 180 can present a larger available storage platform created by the elevated surfaces 174 of the worktop, unencumbered by the side rails. The side rails 180 can also be removed for storage when not in use.

Further, an alternate solar panel 182 is depicted in FIGS. 13 and 14. The solar panel 182 has a tri-fold configuration with three separate solar collectors 183 hinged to one another. The panel 182 can be opened when needed to collect solar energy and can be folded up when not needed. The other side of the panel 182 opposite the collectors 183 can include a hard outer shell to protect the collectors when not in use. The solar panel 182 can be stored on the transport device 50 when not in use or can be stored remotely, if desired.

FIGS. 13 and 14 also illustrate optional supplemental storage receptacles 184 that are mounted to and between the frame arms 98 of the handle assembly 64. These storage receptacles can be in the form of fabric or mesh bags or wire receptacles removably secured to the handle assembly 64. Smaller personal items can be stored in these storage receptacles 184 instead of on the larger worktop 170 in order to protect them from damage and to keep them close at hand. The receptacles can be removable so that a user can carry the receptacles with them when away from the device 50. The receptacles can also be configured with an open top and a single elongate chamber along the handle to store longer objects such as umbrellas, tools, a rifle for hunting, or the like.

Figure 16:
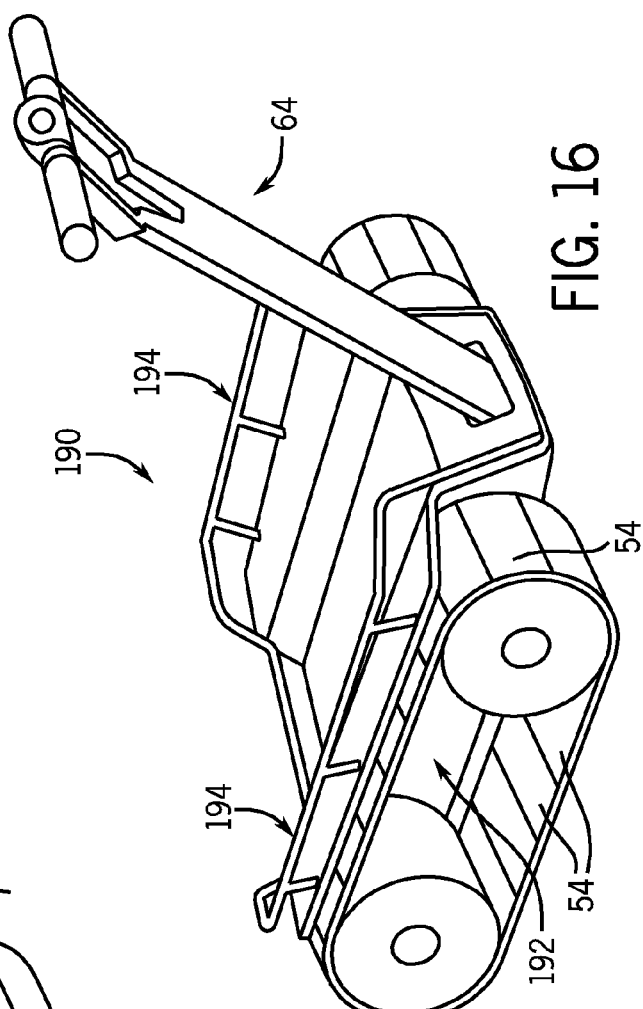
FIG. 16 shows a perspective view of another example of a transport device in accordance with the teachings of the present invention.

FIG. 16 illustrates one of many possible alternate examples of a transport device 190 constructed in accordance with the teachings of the present invention. In this example, the transport device 190 has a chassis 192 with an integral worktop defined by the chassis or body shape. A plurality of a side rails 194 are permanently attached to the worktop of the chassis 192. Such a device could be utilized in airports, bus stations, hotels, spas, fitness centers, or the like for collecting and transporting bags from one location to another. In an alternate example, the previously described transport device 50 could utilize a removable, modular worktop configured like the one on the chassis 192, converting the storage arrangement of the prior describe device 50 for a different use.

FIG. 17 shows another possible alternate example of a transport device 200 constructed in accordance with the teachings of the present invention. In this example, the transport device 200 has a chassis 202 with an upstanding frame structure 204 supporting a seat 206 on the worktop. The seat 206 can be configured as a safety seat or a simple shopping cart-style seat for a child or an infant as depicted. This type of transport device 200 could be utilized in malls, museums, or the like for maintaining control of a child wile perusing such a large environment. The worktop of the transport device 200 in this example can include supplemental storage capacity defined by the chassis 202, the worktop, and/or the frame structure 204. Thus, the seat 206 can be occupied by a child while the supplemental storage capacity can be filled with coats, shopping bags, or the like during use of the device.

FIG. 18 shows yet another possible alternate example of a transport device 210 constructed in accordance with the teachings of the present invention. In this example, the transport device 210 has a generally large, flat platform 212 as the worktop on top of the chassis 214. The platform 212 is surrounded by upstanding, solid wood side rails 216. This type of transport device 210 could be utilized in garden centers or at home for gardening, small construction projects, and the like. The transport device 210 in this example is also illustrated with an alternate handle assembly 218. The handle assembly 218 has a pair of spaced apart frame arms 220 coupled to a cross-bar style handle 222 extending between the distal ends of the frame arms 220. A grip section 224 is provided near the middle of the cross-bar handle 222. Supplemental storage capacity is provided in this alternate example by saddlebag storage receptacles 226. The storage receptacles 226 have hangers 228 that can hang over the side rails. The receptacles can be used for storing smaller items such as tools, seeds, and the like away from the platform.

Figure 20:
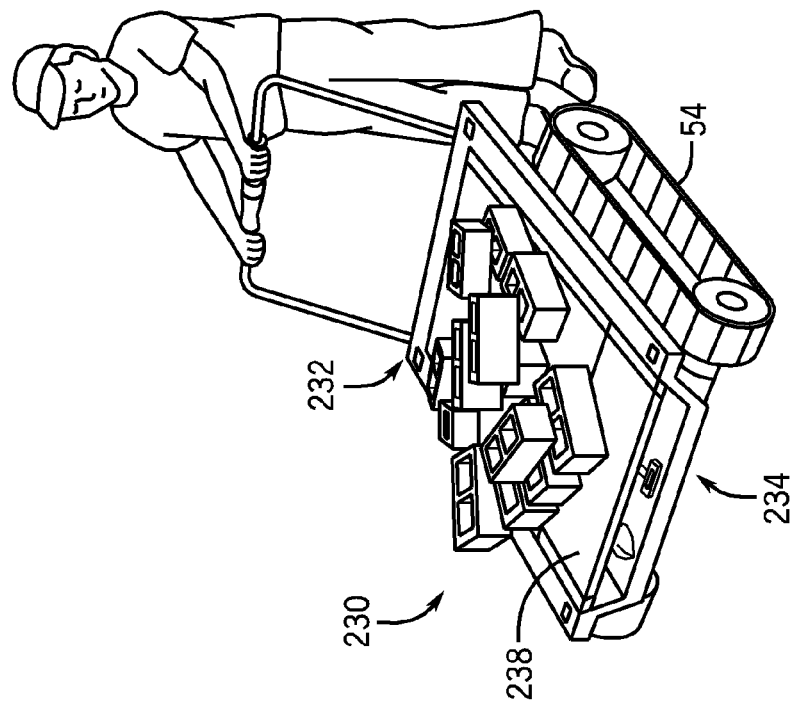
FIGS. 19-21 show perspective views of another example of a transport device in accordance with the teachings of the present invention.
Figure 19:
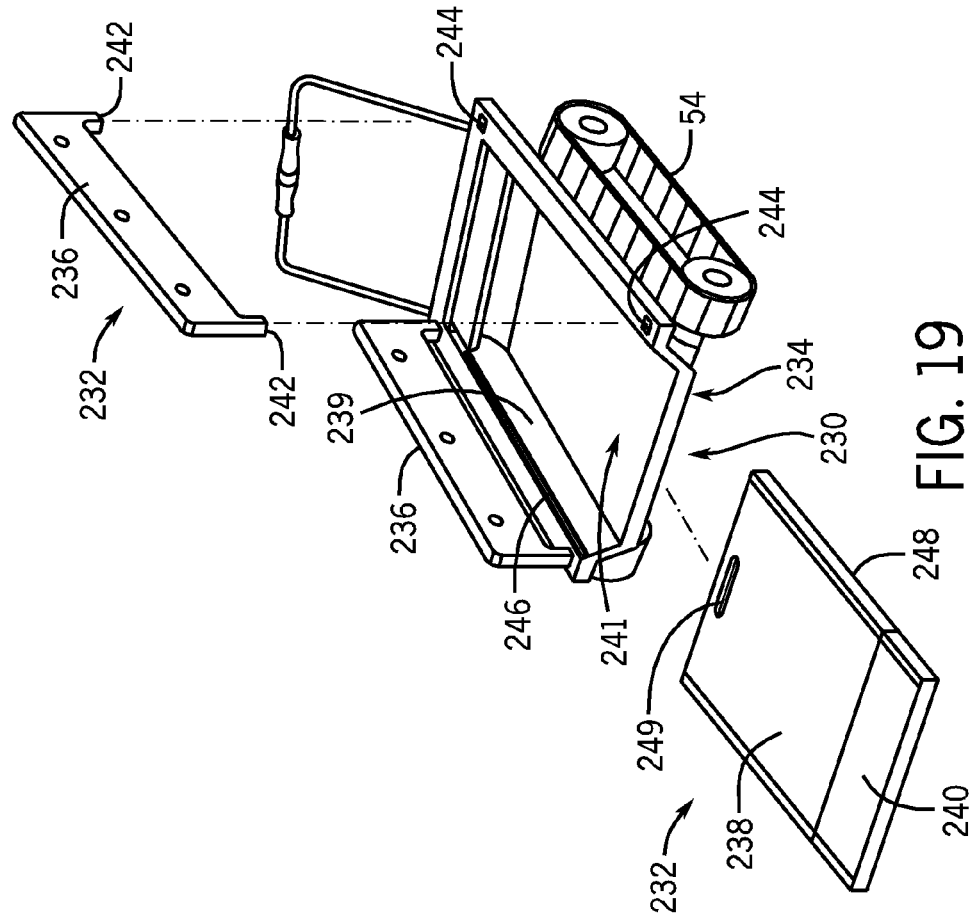
Figure 21:
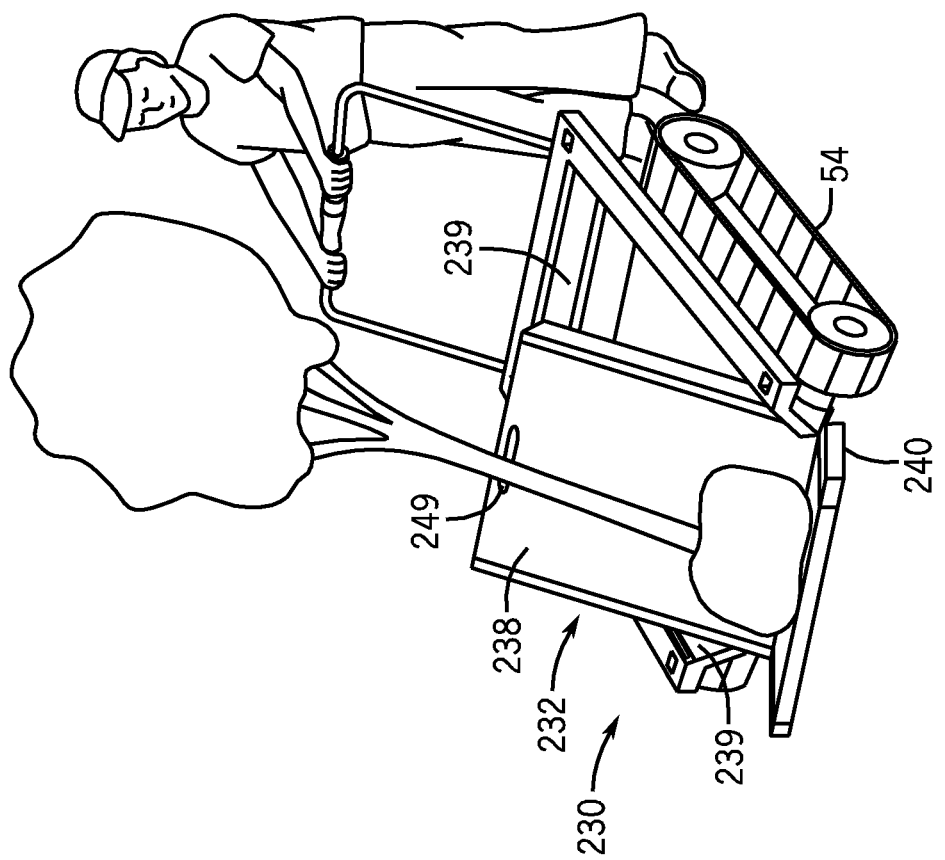

FIGS. 19-21 show still another alternate example of a transport device 230 constructed in accordance with the teachings of the present invention. In this example, the transport device 230 as a versatile, convertible worktop 232 supported on a wide chassis 234. In this example, side rails 236 are removable from the chassis. The side rails 236 have projections 242 on the bottom edge that drop into receptacles 244 on the top of the worktop. The worktop 232 has a removable platform 238 with side edges 248. The platform 238 can be installed on the worktop 232 to provide an elevated storage surface as shown in FIG. 20 over the chassis. The platform 238 can be removed as in FIG. 19 to expose a larger storage cavity or bed 241 with high surrounding side walls 239, similar to a pickup bed. Tracks 246 can be provided in the side walls 239 of the bed 241. The edges 248 of the platform 238 can be slipped into the tracks to install the platform and slid from the tracks to remove the platform. The platform can also include a handle 249, such as an elongate opening near one end to assist in installing, removing, and lifting the platform 238. The bed 241 or the platform 238 can be utilized to carry abundant, large objects as in FIG. 20. This type of transport device 230 may be well suited for construction type work.

In one alternate example, the platform 238 can have a separate foot section 240 at one end that can be pivotally adjusted relative to the main platform 238. The platform 238 can be reconfigured with the foot section 240 at a right angle to the main platform as shown in FIG. 21 to create a dolly-like support. The platform can be mounted to the chassis in an angled or elevated position or can be pivotable about the chassis as in FIG. 21 to a raised position as shown. This configuration can be used to transport tall, heavy objects on the foot section 240, leaning against the platform 238. In such an example, the platform 238 and foot section 240 can be arranged parallel to one another as in FIG. 19 whereby the platform can be tilted up in order to dump contents stored on its surface.

Figure 23:
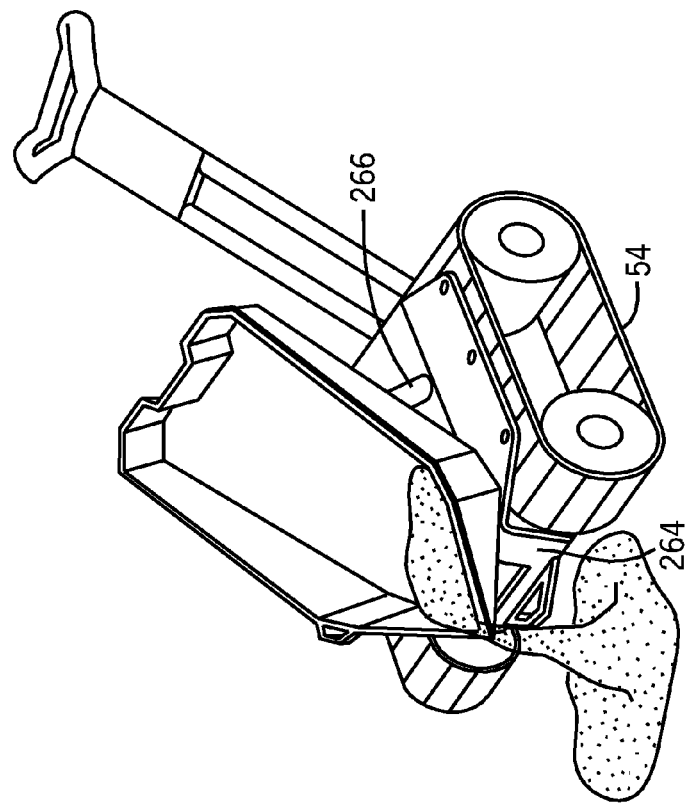
FIGS. 22 and 23 show perspective views of another example of a transport device in accordance with the teachings of the present invention.
Figure 22:
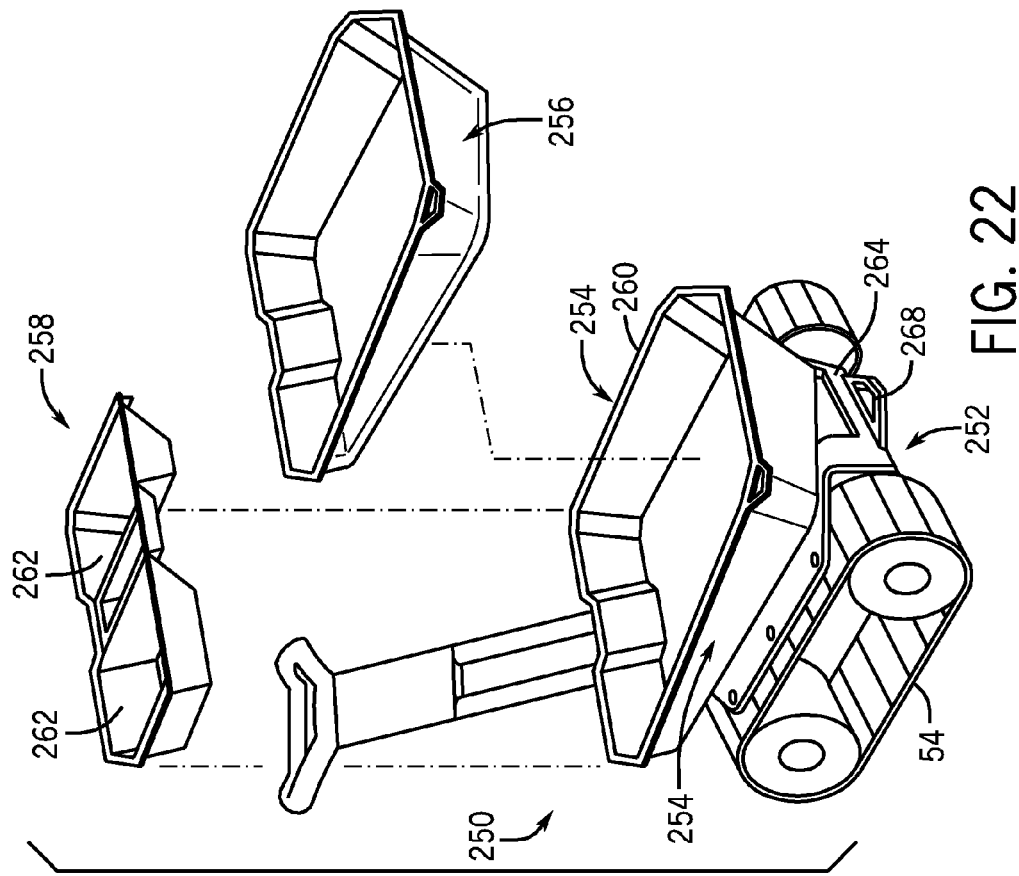

FIGS. 22 and 23 illustrate yet another alternate example of a transport device 250 constructed in accordance with the teachings of the present invention. In this example, the transport device 250 has a chassis 252 supporting a worktop in the form of a wheelbarrow tub 254. The wheelbarrow tub 254 can be formed as part of the chassis 252, can be a removable element exposing a different worktop surface when removed, or can be a modular worktop that can be swapped out for other worktop structures as disclosed in described herein. A clear plastic liner 256 having the same tub shape as the wheelbarrow can be inserted into the tub 254 to protect the surfaces of the tub, if desired. A supplemental storage caddy 258 is also shown. The caddy 258 can be configured to catch and rest on the top edge 260 of the wheelbarrow tub 254. The caddy 258 can be formed having a number of storage receptacles 262 therein for storing smaller items during use of the transport device 250. The storage caddy 258 can vary in configuration and construction, as can the wheelbarrow tub 254. FIG. 23 shows that the wheelbarrow tub 254 can optionally be pivotable about a forward end 264 of the chassis 252 so that material can be readily dumped from the tub without having to lift the entire transport device 250. Hydraulic assist can be provided in the form of hydraulic cylinders 266 to help raise and lower the wheelbarrow tub during use. FIG. 22 shows that the transport device 250 can have a tow hook or loop 268 at one end so that the device can be towed if needed.

The various features and options disclosed one each of the different transport device examples herein can in many cases be employed on the other disclosed devices. Other optional features, options, storage accessories, secondary storage containers, and the like can also be provided though not shown or described herein. A cooler or insulated container can be integrally built into a worktop of the devices. A fan or chilling unit can be provided within the unit to move air inside such a container, if desired. Hangers, hooks, connectors, loops, and the like can also be employed, added on, or integrally formed as a part of any one of the disclosed devices and on virtually any part of the devices. In one example, bungee cord hooks or catches 270 can be provided on the worktop, such as is shown in FIG. 1 at the corners of the worktop 62. Bungees can be easily attached to the worktop to help secure objects being transported thereon, if desired. Many other optional features and options are also possible. Catches or connectors for securing tie downs or netting can also be provided.

The various chassis, worktop, handle, wheel, and track components can be constructed of virtually any suitable or desired materials. The parts can in many cases be designed to snap together or to easily fasten together using conventional fasteners. The wheel rim sections can be bolded together, for example. It is foreseeable that the tracks may need to be serviced from time to time, and thus can be readily and easily removable by detaching the outer rim sections. Many of the components can also be integrally formed as part of another component on a device, if desired. Plastic or composite materials can be used to fabricate many of the components, rendering the transport devices durable, lightweight, easy to manufacture, and easy to assembly. Metal can certainly be used if and where desired. For instance, the body 70 can be a stamped tub, while the wheels and worktop can be plastic. The wheels can be aluminum or other types of metal as well. The tracks could be rubber, metal. And rubber assemblies, plastic, or the like. The rails 110 and 92 can be tubes of metal, solid plastic, hollow plastic, wood, or the like.

The disclosed transport devices are each motorized and thus self propelled. The user can control operation of the motor to move the device and any items carried on the worktop to a desired location. The handle allows a user to walk behind the device during use, which will render it very easy to transport goods using the device. The tracks allow the transport devices disclosed herein to operate on virtually any terrain including sand, rocks, uneven earth, dirt, mud, snow, gravel, and the like. The disclosed transport devices are a significant improvement over prior known carts, dollies, wagons, and the like. The disclosed devices can be modular in nature, allowing a basic chassis structure to accommodate a variety of different worktops, if desired. One worktop with one storage or loading arrangement can be swapped for another with a completely different storage arrangement. The transport devices can be configured to accommodate many different uses and can be used to transport objects to the beach, in picnic areas, in the woods, and the like. The transport devices can be configured for recreational purposes such as vacationing or shopping, or configured for work sue such as gardening, construction, and the like. The disclosed devices can be modular in nature or have a dedicated configuration. In either case, the devices can be used to transport virtually any objects such as lumber, bricks, chairs, coolers, tools, luggage, shopping bags, and the like.

The worktop 62 has a multilevel surface that is versatile for storing large heavy items on the trough surface and lighter, smaller items on the elevated surface. The side rails can be high enough to extend the storage capacity of the device and can be angled outward as well for the same purpose. Accessory storage compartments and bags can also be provided on the device. These bags or compartments may also be removable, if desired to be taken away by a user when away from the device.

The handle assembly and side rails, as well and the front barrier can employ latches, detents, interlocks, Valco-ball catches, or locking mechanisms to hold them in a desired in-use, collapsed, extended, or retracted position. The mechanisms and components for such latches, detents, and locks can vary.

Although certain transport devices, components and features have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A transport device comprising:
   a chassis having a front end, a rear end, and a worktop;
   a continuous track supporting the chassis above a surface and configured to move the chassis along the surface;
   a handle extending from the front end or rear end of the chassis and having a grip section positioned to be gripped by a user walking ahead of or behind the chassis;
   a motor coupled and arranged to drive the continuous track and operable by a user manipulating the handle; and
   a solar panel removably carried on part of the transport device, wherein the motor is an electric motor coupled to a battery that can be recharged by the solar panel.

2. A transport device according to claim 1, wherein the handle extends rearward from the rear end and is pushed forward to operate the motor to move the transport device forward and is pulled rearward to operate the motor to move the transport device rearward.

3. A transport device according to claim 1, wherein the chassis is configured to removably accept a plurality of optionally different worktops thereon.

4. A transport device according to claim 1, wherein the worktop is a wheelbarrow tub on the chassis.

5. A transport device according to claim 1, wherein the worktop has a work surface thereon, and wherein the work surface is pivotally connected to and tiltable forward about the front end of the chassis.

6. A transport device according to claim 1, wherein the worktop defines a storage surface thereon, and wherein a pair of side rails extend along opposed sides of the storage surface.

7. A transport device according to claim 6, wherein the side rails can be removed from the transport device.

8. A transport device according to claim 6, wherein the side rails can be pivoted inward and downward onto the worktop or outward and downward along opposed sides of the chassis or both.

9. A transport device according to claim 1, further comprising two of the tracks, one arranged adjacent each side of the chassis.

10. A transport device according to claim 9, further comprising two pairs of wheels, each pair having a front and a back wheel for driving a respective one of the two tracks, each wheel having an outer rim section fastened to and removable from an inner rim section.

11. A transport device according to claim 10, wherein the inner and outer rim sections each have an annular rim flange, and wherein each track is captured between the rim flanges of the inner and outer rim sections of the front and back wheel of each pair of wheels.

12. A transport device according to claim 1, wherein the grip section of the handle includes a trigger actuable to select and change the speed of the motor and has an actuator that can be actuated to select and change the motor direction between a forward direction and a reverse direction.

13. A transport device according to claim 1, wherein the handle can be collapsed down onto the worktop.

14. A transport device according to claim 1, wherein the chassis is a modular structure configured to removably support any selected one of a plurality of optional worktops thereon.

15. A transport device according to claim 14, wherein the plurality of optional worktops include two or more of a tub-shaped container, a multilevel storage surface, a generally planar platform, a reconfigurable storage surface, a multi-compartment storage box, and a seat.

16. A transport device according to claim 1, wherein the front end of the chassis has a generally vertical barrier, and wherein the barrier can be adjustably moved toward and away from the front end to extend a storage capacity of part of the worktop.

17. A transport device according to claim 1, wherein the worktop has an insulated chamber built into a portion of the chassis.

18. A transport device comprising:
- a chassis having a front end, a rear end, and a worktop having a multilevel storage surface thereon, the multilevel storage surface comprising a first storage surface at a first elevation and a second storage surface at a second elevation different than the first elevation;
- a continuous track supporting the chassis above a surface and configured to move the chassis along the surface;
- a handle extending from the front end or rear end of the chassis and having a grip section positioned to be gripped by a user walking ahead of or behind the chassis; and
- a motor coupled and arranged to drive the continuous track and operable by a user manipulating the handle.

19. A transport device according to claim 18, wherein the handle extends rearward from the rear end and is pushed forward to operate the motor to move the transport device forward and is pulled rearward to operate the motor to move the transport device rearward.

20. A transport device according to claim 18, wherein the chassis is configured to removably accept a plurality of optionally different worktops thereon, the plurality of optionally different worktops including the worktop having the multilevel storage surface.

21. A transport device according to claim 20, wherein the plurality of optional worktops further includes one or more of a wheelbarrow tub, a generally planar platform, a reconfigurable storage surface, a multi-compartment storage box, and a seat.

22. A transport device according to claim 18, wherein the multilevel storage surface is pivotally connected to and tiltable forward about the front end of the chassis.

23. A transport device according to claim 18, further comprising two of the tracks, one arranged adjacent each side of the chassis.

* * * * *